(12) United States Patent
Wassvik et al.

(10) Patent No.: US 10,268,319 B2
(45) Date of Patent: Apr. 23, 2019

(54) EDGE-COUPLED TOUCH-SENSITIVE APPARATUS

(71) Applicant: FlatFrog Laboratories AB, Lund (SE)

(72) Inventors: Ola Wassvik, Brosarp (SE); Håkan Bergström, Torna-Hallestad (SE); Gustav Fagrenius, Dalby (SE)

(73) Assignee: FlatFrog Laboratories AB, Lund (SE)

( * ) Notice: Subject to any disclaimer, the term of this patent is extended or adjusted under 35 U.S.C. 154(b) by 185 days.

(21) Appl. No.: 14/652,736

(22) PCT Filed: Dec. 17, 2013

(86) PCT No.: PCT/SE2013/051534
§ 371 (c)(1),
(2) Date: Jun. 16, 2015

(87) PCT Pub. No.: WO2014/098742
PCT Pub. Date: Jun. 26, 2014

(65) Prior Publication Data
US 2015/0331547 A1 Nov. 19, 2015

Related U.S. Application Data

(60) Provisional application No. 61/738,022, filed on Dec. 17, 2012.

(30) Foreign Application Priority Data

Dec. 17, 2012 (SE) ........................................ 1251438

(51) Int. Cl.
*G06F 3/042* (2006.01)
*G06F 1/16* (2006.01)

(52) U.S. Cl.
CPC .............. *G06F 3/0428* (2013.01); *G06F 1/16* (2013.01); *G06F 3/042* (2013.01); *G06F 2203/04107* (2013.01); *G06F 2203/04109* (2013.01)

(58) Field of Classification Search
CPC ........... G06F 2203/04109; G06F 3/042; G06F 3/0428; G06F 2203/04103; G06F 3/0421; G06F 2203/04104; G06F 3/0416
(Continued)

(56) References Cited

U.S. PATENT DOCUMENTS 3,673,327 A 6/1972 Johnson et al.
7,432,893 B2 10/2008 Ma et al.
(Continued)

FOREIGN PATENT DOCUMENTS

WO WO-2008/004097 A2 1/2008
WO WO-2009/077962 A2 6/2009
(Continued)

OTHER PUBLICATIONS

International Search Report and Written Opinion dated May 6, 2014 issued in corresponding International Application No. PCT/SE2013/051534.
(Continued)

*Primary Examiner* — Kent W Chang
*Assistant Examiner* — Sujit Shah
(74) *Attorney, Agent, or Firm* — Knobbe, Martens, Olson & Bear, LLP

(57) ABSTRACT

A touch-sensitive apparatus includes a light-transmissive panel having a front surface, an opposite rear surface, and a side edge connecting the front and rear surfaces, and a light-transmissive sheet laminated over the front surface of the light-transmissive panel. The light-transmissive sheet has a portion extending beyond the side edge of the light-
(Continued)

transmissive panel to cover a light emitter and detector. The touch-sensitive apparatus further includes a shielding element on a lower surface of the light-transmissive sheet, the shielding element covering at least said light emitter and detector, and the shielding element blocking light having a wavelength range in which the light emitter outputs light. The lower surface of the light-transmissive sheet is in optical contact with the front surface of the light-transmissive panel.

19 Claims, 5 Drawing Sheets

(58) Field of Classification Search
USPC .................................................. 345/173–179
See application file for complete search history.

(56) References Cited

U.S. PATENT DOCUMENTS

| | | | |
|---|---|---|---|
| 8,599,140 B2 | 12/2013 | Crockett et al. | |
| 9,557,846 B2 | 1/2017 | Baharav et al. | |
| 2005/0248540 A1 | 11/2005 | Newton | |
| 2006/0114237 A1 | 6/2006 | Crockett et al. | |
| 2008/0007541 A1* | 1/2008 | Eliasson | G06F 3/0421 345/176 |
| 2008/0007542 A1* | 1/2008 | Eliasson | G06F 3/0346 345/176 |
| 2008/0088603 A1* | 4/2008 | Eliasson | G06F 3/0312 345/176 |
| 2008/0252619 A1 | 10/2008 | Crockett et al. | |
| 2009/0122020 A1 | 5/2009 | Eliasson et al. | |
| 2009/0295752 A1* | 12/2009 | Liu | G06F 3/044 345/174 |
| 2010/0045634 A1* | 2/2010 | Su | G06F 3/0421 345/175 |
| 2011/0043490 A1* | 2/2011 | Powell | G06F 3/0421 345/176 |
| 2011/0122091 A1* | 5/2011 | King | G06F 3/0421 345/175 |
| 2011/0255305 A1* | 10/2011 | Chen | G02B 6/0035 362/619 |
| 2012/0019448 A1 | 1/2012 | Pitkanen et al. | |
| 2012/0169672 A1* | 7/2012 | Christiansson | G06F 3/0421 345/175 |
| 2012/0200532 A1 | 8/2012 | Powell et al. | |
| 2012/0249478 A1 | 10/2012 | Chang et al. | |
| 2013/0021302 A1 | 1/2013 | Drumm | |
| 2013/0135258 A1* | 5/2013 | King | G06F 3/0421 345/175 |
| 2013/0285977 A1 | 10/2013 | Baharav et al. | |
| 2013/0300716 A1 | 11/2013 | Craven-Bartle et al. | |

FOREIGN PATENT DOCUMENTS

| | | |
|---|---|---|
| WO | WO 2010/015408 A1 | 2/2010 |
| WO | WO-2010/064983 A2 | 6/2010 |
| WO | WO-2011/031215 A1 | 3/2011 |
| WO | WO-2011/049511 A1 | 4/2011 |
| WO | WO-2011/139213 A1 | 11/2011 |
| WO | WO-2012/050510 A1 | 4/2012 |
| WO | WO-2012/105893 A1 | 8/2012 |
| WO | WO-2013/062471 A2 | 5/2013 |
| WO | WO-2013/191638 A1 | 12/2013 |
| WO | WO-2014/017973 A1 | 1/2014 |

OTHER PUBLICATIONS

International Search Report and Written Opinion dated Apr. 14, 2014 issued in International Application No. PCT/SE2013/051533.
Chen, Yun. "Using micro-structures to couple light into thin lightguides." Master of Science Thesis; Stockholm, 2011.
Non-Final Office Action dated May 4, 2017 in U.S. Appl. No. 14/652,757.
Final Office Action dated Nov. 24, 2017 in U.S. Appl. No. 14/652,757.

* cited by examiner

EDGE-COUPLED TOUCH-SENSITIVE APPARATUS

CROSS-REFERENCE TO RELATED APPLICATIONS

This application is a national phase under 35 U.S.C. § 371 of PCT International Application No. PCT/SE2013/051534 which has an International filing date of Dec. 17, 2013, which claims priority to Sweden patent application number SE 1251438-6 filed Dec. 17, 2012 and U.S. provisional patent application No. 61/738,022 filed Dec. 17, 2012.

TECHNICAL FIELD

The present invention relates to the field of touch-sensing systems that operate by propagating light by internal reflections along well-defined light paths inside a thin light-transmissive panel, and in particular to edge-coupled solutions for providing a robust and user friendly touch-sensitive apparatus.

BACKGROUND ART

This type of touch-sensing system is known as an FTIR-based system (FTIR, Frustrated Total Internal Reflection). It may be implemented to operate by transmitting light inside a solid light-transmissive panel, which defines two parallel boundary surfaces connected by a peripheral edge surface. Light generated by a plurality of emitters is coupled into the panel so as to propagate by total internal reflection (TIR) between the boundary surfaces to a plurality of detectors. The light thereby defines propagation paths across the panel, between pairs of emitters and detectors. The emitters and detectors are arranged such that the propagation paths define a grid on the panel. An object that touches one of the boundary surfaces ("the touch surface") will attenuate ("frustrate") the light on one or more propagation paths and cause a change in the light received by one or more of the detectors. The location (coordinates), shape or area of the object may be determined by analyzing the received light at the detectors. This type of apparatus has an ability to detect plural objects in simultaneous contact with the touch surface, known as "multi-touch" in the art.

There are different ways of coupling light into and out from the panel. One way is to attach prisms or wedges to the bottom surface of the panel. Such solutions have the benefit that light may be coupled within controllable angles, and it also allows a flush, edge-to-edge solution, for the top surface. However, the prisms or wedges may add significant thickness and weight to the system.

In another configuration, e.g. disclosed in US2006/0114237, the light is coupled into the panel directly through a peripheral side edge surface. Such an approach allows the light to be simply and efficiently injected into the panel. Also, such an in-coupling does not add significantly to the thickness of the touch system. On the other hand, in-coupling via the edge surface may add to the footprint of the touch system. Furthermore, mounting and calibration of light emitters and detectors with respect to the side edge may be difficult in order to obtain an acceptable production yield.

SUMMARY

It is an objective of the invention to at least partly overcome one or more of limitations of prior art FTIR-based touch systems.

More specifically, it is an objective to provide an FTIR-based touch-sensitive apparatus which is comparatively robust and compact.

One or more of these objectives, and other objectives that may appear from the description below, are at least partly achieved by means of touch-sensitive apparatuses according to the independent claims, embodiments thereof being defined by the dependent claims.

In accordance with one aspect, the invention relates to a touch-sensitive apparatus, comprising: a light-transmissive panel having a front surface, an opposite rear surface, and a side edge connecting the front and rear surfaces; a light emitter connected to input light at a first side edge portion; a detector connected to receive light output at a second side edge portion; and a light-transmissive sheet laminated over the front surface of the panel and having a portion extending beyond the side edge of the panel to cover the emitter and the detector; wherein a lower surface of the light-transmissive sheet is in optical contact with the front surface of the panel, so as to allow input light to propagate between the emitter and the detector through the panel and the light-transmissive sheet via total internal reflection in an upper surface of the light-transmissive sheet.

In one embodiment, the touch-sensitive apparatus comprises a support element carrying at least one of said emitter and said detector, which support element is secured towards the lower surface of the light-transmissive sheet.

In one embodiment, the touch-sensitive apparatus comprises support element carrying at least one of said emitter and said detector, which support element is secured towards the rear surface of the panel.

In one embodiment, said support element is a printed circuit board.

In one embodiment, said support element is a flex film.

In one embodiment, said support element is an elongate strip, provided along an extended portion of the side edge, and carrying a plurality of emitters and/or detectors.

In one embodiment, the touch-sensitive apparatus comprises a side connecting element, configured to secure at least one of said emitter and detector towards the side edge of the panel.

In one embodiment, the touch-sensitive apparatus said side connecting element comprises a transparent adhesive or silicon, and provides optical matching to the panel.

In one embodiment, the touch-sensitive apparatus comprises a shielding element applied along a perimeter of the panel and under the light-transmissive sheet, covering at least said emitter and detector;

In one embodiment, the shielding element is formed on the lower surface of the light-transmissive sheet.

In one embodiment, the shielding element is a rigid metal sheet member configured to reinforce the portion of the light-transmissive sheet extending beyond the side edge of the panel.

In one embodiment, the shielding element is partly sandwiched between the panel and the light-transmissive sheet.

In one embodiment, the shielding element covers an outer region of the front surface to prevent ambient light incident on the upper surface, within a predetermined wavelength range of use, from specularly reaching at least said detector.

In one embodiment, the shielding element is non-transmissive to visible light.

In one embodiment, a lower surface of the shielding element which faces said outer region of the front surface of the panel is specularly reflective within the predetermined wavelength range of use.

In one embodiment, the touch-sensitive apparatus comprises a shielding element applied along a perimeter of the panel and under the light-transmissive sheet, covering at least said emitter and detector, and a support element carrying at least one of said emitter and said detector, which support element is secured towards the lower surface of the light-transmissive sheet.

In one embodiment, the light-transmissive sheet includes a rigid layer.

In one embodiment, at least one rigid layer of the light-transmissive sheet is made from the same material as the light-transmissive panel.

In one embodiment, the touch-sensitive apparatus comprises a light coupling member, arranged at the side edge to optically connect at least one of the emitter and the detector to the panel.

In one embodiment, the light coupling member includes at least one non-imaging, diffusively transmitting optical element arranged on the side edge of the panel; wherein the emitter is arranged to emit a beam of light onto the non-imaging optical element; and wherein the detector is arranged to receive detection light generated, by diffuse transmission, as propagating light from within the panel impinges on the non-imaging optical element.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1A:
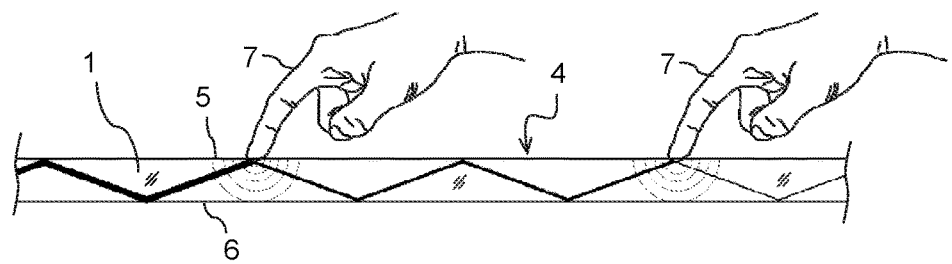
FIG. 1A is a section view of a light transmissive panel using FTIR for touch detection.

In the following, embodiments of the present invention will be presented for a touch-sensitive apparatus incorporating a laminated optical element. Throughout the description, the same reference numerals are used to identify corresponding elements.

FIG. 1A illustrates the concept of touch detection based on attenuation by FTIR (Frustrated Total Internal Reflection) of propagating light. According to this concept, light is transmitted inside a panel 1 along a plurality of well-defined propagation paths. The panel 1 is made of a solid material in one or more layers and may have any shape. The panel 1 defines an internal radiation propagation channel, in which light propagates by internal reflections. In the example of FIG. 1A, the propagation channel is defined between the boundary surfaces 5, 6 of the panel 1, and the front (top) surface 5 allows the propagating light to interact with touching objects 7 and thereby defines a touch-sensitive region 4. The interaction is enabled by injecting the light into the panel 1 such that the light is reflected by total internal reflection (TIR) in the front surface 5 as it propagates through the panel 1. The light may be reflected by TIR in the rear (bottom) surface 6 or against a reflective coating thereon. It is also conceivable that the propagation channel is spaced from the rear surface 6, e.g. if the panel comprises multiple layers of different materials. The panel 1 may thus be made of any solid material (or combination of materials) that transmits a sufficient amount of light in the relevant wavelength range to permit a sensible measurement of transmitted energy. Such material includes glass, poly(methyl methacrylate) (PMMA) and polycarbonates (PC). The panel 1 may be designed to be overlaid on or integrated into a display device or monitor (not shown in FIG. 1A).

As shown in FIG. 1A, an object 7 that is brought into close vicinity of, or in contact with, the touch-sensitive region 4 may interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or equivalently, the power or intensity) of the transmitted light, as indicated by the thinned lines downstream of the touching objects 7 in FIG. 1A.

Figure 1B:
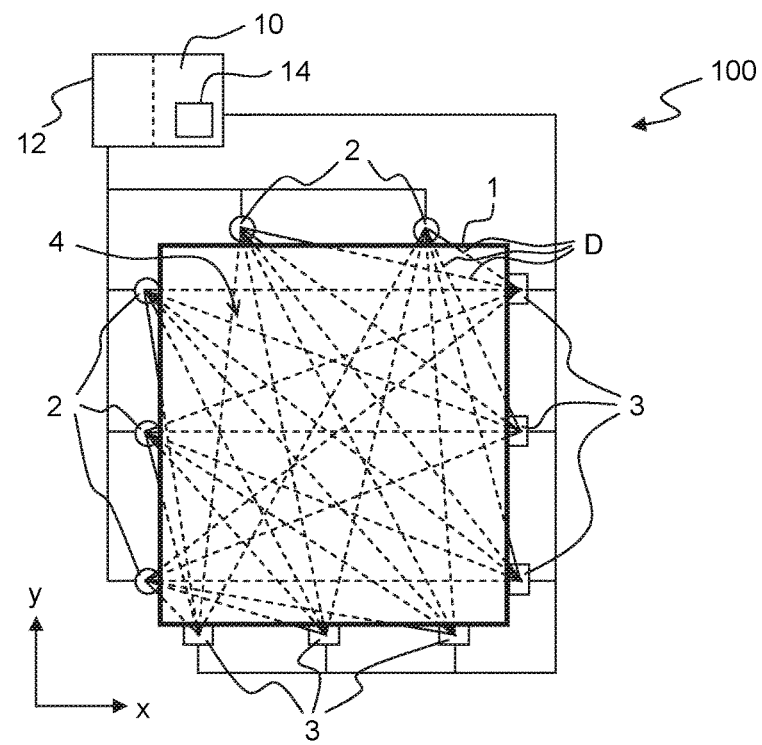
FIG. 1B is a top plan view of an FTIR-based touch-sensitive apparatus.

FIG. 1B illustrates an example embodiment of a touch-sensitive apparatus 100 that is based on the concept of FTIR. Emitters 2 (indicated by open circles throughout the description) are distributed along the perimeter of the touch-sensitive region 4, around the panel 1, to project light onto the panel 1 such that at least part of the light is captured inside the panel 1 for propagation by internal reflections in the propagation channel. Detectors 3 (indicated by open squares throughout the description) are distributed along the perimeter of the touch-sensitive region 4, around the panel 1, to receive part of the propagating light. The light from each emitter 2 will thereby propagate inside the panel 1 to a number of different detectors 3 on a plurality of light propagation paths D. Even if the light propagation paths D correspond to light that propagates by internal reflections inside the panel 1, the light propagation paths D may conceptually be represented as "detection lines" that extend across the touch-sensitive region 4 between pairs of emitters 2 and detectors 3, as shown in FIG. 1B. Thus, the detection lines correspond to a projection of the propagation paths D onto the touch-sensitive region 4. Thereby, the emitters 2 and detectors 3 collectively define a grid of detection lines D ("detection grid") on the touch-sensitive region 4, as seen in a top plan view. The spacing of intersections in the detection grid defines the spatial resolution of the apparatus 100, i.e. the smallest object that can be detected on the touch-sensitive region 4.

As used herein, the emitters 2 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 2 may also be formed by the end of an optical fiber. The emitters 2 may generate light in any wavelength range. The following examples presume that the light is generated in the infrared (IR), i.e. at wavelengths above about 750 nm. Analogously, the detectors 3 may be any device capable of converting light (in the same wavelength range) into an electrical signal, such as a photo-detector, a CCD device, a CMOS device, etc.

The detectors 3 collectively provide an output signal, which is received and sampled by a signal processor 10. The output signal contains a number of sub-signals, also denoted "projection signals", each representing the energy of light received by a certain light detector 3 from a certain light emitter 2. Depending on implementation, the signal processor 10 may need to process the output signal for separation of the individual projection signals. The projection signals represent the received energy, intensity or power of light received by the detectors 3 on the individual detection lines D. Whenever an object touches a detection line, the received energy on this detection line is decreased or "attenuated".

Figure 2:
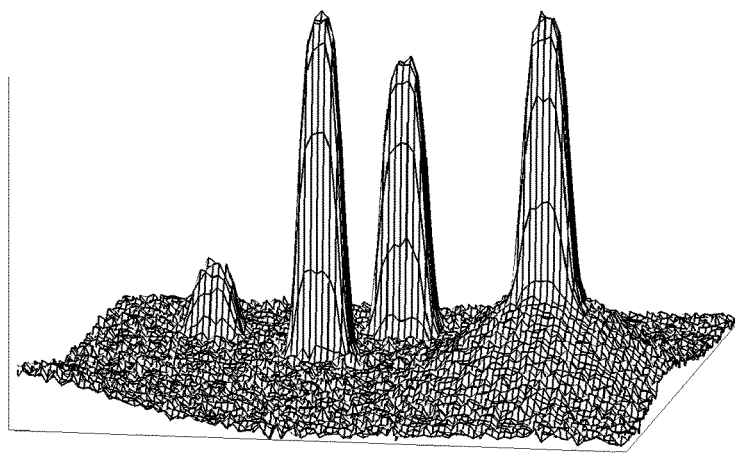
FIG. 2 is a 3D plot of an attenuation pattern generated based on energy signals from an FTIR-based touch-sensitive apparatus.

The signal processor 10 may be configured to process the projection signals so as to determine a property of the touching objects, such as a position (e.g. in the x,y coordinate system shown in FIG. 1B), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 2, where the peaks of increased attenuation represent touching objects. The attenuation pattern may be further processed by the signal processor 10 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14.

Figure 3:
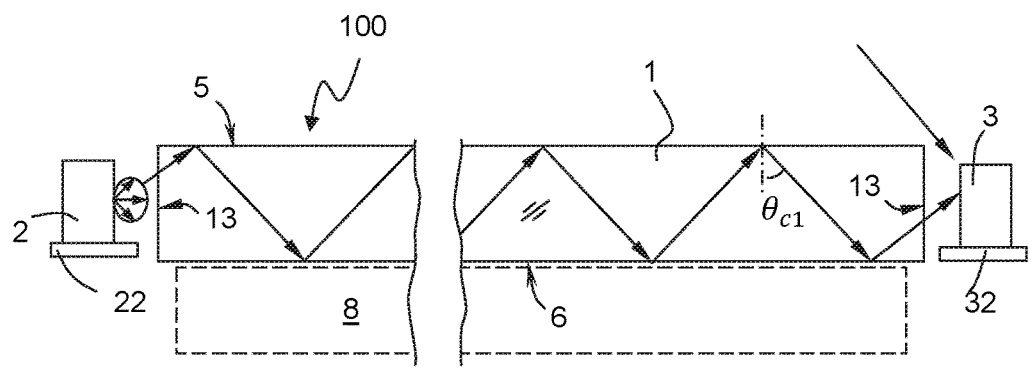
FIG. 3 is a section view of an example of a touch-sensitive apparatus.

FIG. 3 is a section view of an example of an FTIR-based touch-sensitive apparatus 100, which makes use of an edge-coupled mechanism for light coupling. Emitters 2 (one shown) and detectors 3 (one shown) are provided at different side edge portions of a side edge 13 of a light-transmissive panel 1. The emitter 2 may emit light within a wide cone angle, and is preferably placed near the side edge 13 such that a major part of the emitter light is coupled into the panel 1. Typically, some form of arrangement would also be employed for connecting light from the emitter 2 into the panel 1, such as an optical matching or an optical coupling element. For the sake of simplicity, such elements have been left out in this drawing. It should be noted that the drawings are all schematic, which is why refraction in the side edges is not indicated. Entered light will at least partly propagate by TIR in the panel 1, of which some light will reach the side edge portion at the detector 3, and be coupled out to the detector 3. Total Internal Reflection (TIR) in the panel 1 is represented by a set of arrows from emitter 2 to detector 3, and $\theta_{c1}$ represents the critical angle for internal reflection as given by Snell's law. As is well known to the skilled person, also light impinging on the surfaces 5 and 6 from within the panel 1 at angles that are wider than the critical angle $\theta_{c1}$ will propagate by TIR. A light coupling mechanism (not shown) may be provided for controlling the input and/or output of light, such as a lens arrangement at the side edge 13 of the panel 1. For one thing, such a light coupling mechanism may comprise a refractive element, or alternatively a light blocker or absorber, arranged between the emitter 2 and the adjacent side edge portion, to prevent light from being coupled in to the panel 1 that would reach the detector 3 without any reflection in the front surface 5. Such unreflected light would only add to the background noise level at the detector 3, and would not be usable for detecting touch input. The emitter 2 is carried on a support element 22, such as a PCB (Printed Circuit Board) which is designed to supply power and transmit control signals to the emitter 2. Correspondingly, the detector 3 is carried on a support element 32, which may also be a PCB, designed to supply power to and transmit measurement data from the detector 3. A backside panel 8 may be provided under the touch-sensitive apparatus 100, such as a display device 8 having a display surface facing rear side 6 so as to be visible through the touch-sensitive apparatus 100.

An arrangement in accordance with FIG. 3 places high requirements on assembly. In order to provide a reliable and robust touch-sensing system, the emitter(s) 2 and detector(s) 3 need to be consistently and securely attached with respect to the panel 1. Environmental factors, such as temperature and humidity, will affect the alignment of the emitters 2 and detectors 3 with respect to the panel 1, and proper assembly may also be affected by mechanical stress from mounting structures and by subsequent use of the touch-sensitive apparatus 100. From another aspect, there is a risk that ambient light, or light from the emitter 2 scattered or reflected within the apparatus 100, will reach the detector 3 without passing through the panel 1. In the drawing, this is illustrated by an arrow impinging from above on the detector 3. Any such light will have nothing but negative effect on the performance of the apparatus, since it will increase the noise level at the detector 3. Therefore, a light screen will often have to be employed above the side edge 13.

Figure 4:
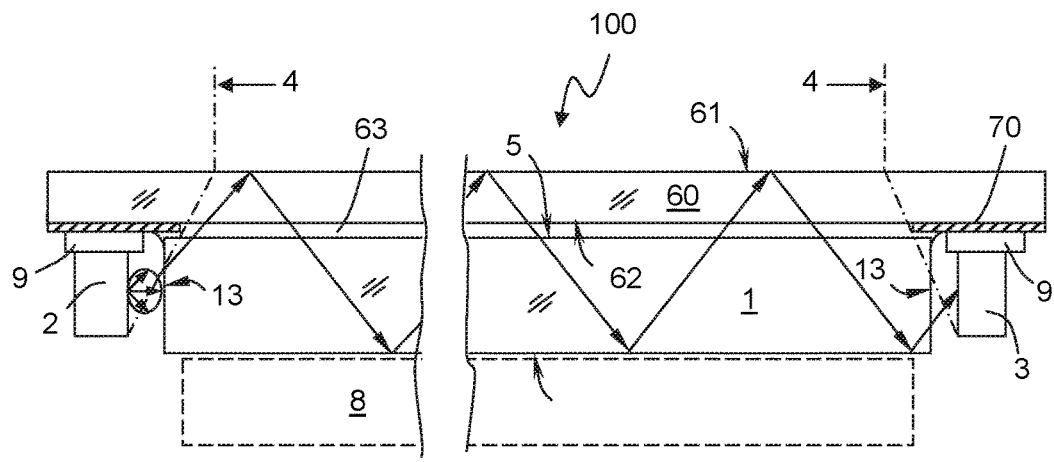
FIG. 4 is a section view of an edge-coupled laminated touch-sensitive apparatus according to an embodiment of the invention.
Figure 5:
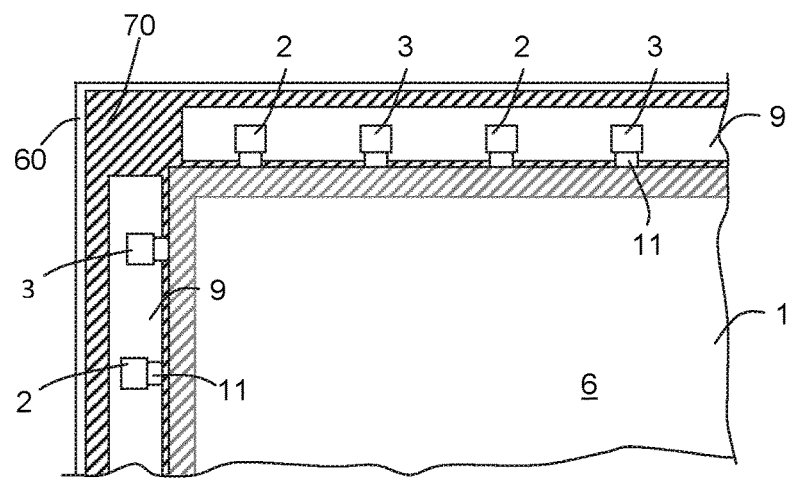
FIG. 5 is a bottom plan view of a touch-sensitive apparatus according to one embodiment.

FIGS. 4-7 illustrate an embodiment of the invention, in which a laminated structure is employed to provide an improved touch-sensitive apparatus 100, which is set to alleviate at least some of the deficiencies associated with arrangements in accordance with prior art designs such as the one in FIG. 3. While FIG. 4 only depicts one emitter 2 and one detector 3, it should be understood that a plurality of emitters 2 and detectors 3 are normally included. These may be arranged with several emitters arranged next to each other along one side of the panel 1, and several detectors arranged next to each other along another side, corresponding to the embodiment of FIG. 1B. Alternatively, several emitters 2 and detectors 3 may be alternately arranged along at least two sides, as shown in FIG. 5.

In the embodiment of FIG. 4, a light-transmissive sheet 60 is laminated over the front surface 5 of the panel 1. This light-transmissive sheet 60 preferably covers the entire front surface 5, and also extends beyond the side edge 13. The light-transmissive sheet 60 is made from a material selected to optically comply with the panel 1. That way, the lower surface 62 of the light-transmissive sheet 60 is in optical connection with the front surface 5 of the panel 1, so as to allow input light to propagate between an emitter 2 and a detector 3 through the panel 1 and through the light-transmissive sheet 60, via total internal reflection in an upper surface 61 of the light-transmissive sheet 60, as indicated by the arrows in the drawing. Preferably, optical matching is obtained by selecting materials such that the refractive indices of the light-transmissive sheet 60 and the panel 1 are close. In one embodiment, the light-transmissive sheet 60 may be connected to the panel 1 by means of an optical bonding element 63. Such a bonding element 63 may be a film which is sandwiched between the panel 1 and the light-transmissive sheet 60 to act as an adhesive. Examples of such films are Optically Clear Adhesive (OCA) and Contrast Enhancement Film (CEF), both provided by 3M™, which are usable for both flexible-to-rigid and rigid-to-rigid lamination. In other embodiments, the bonding element 63 may be provided in liquid form which is subsequently cured, in either a wet bonding process or a dry bonding process, both of which are well known in the art of lamination. In one embodiment, silicon may be used as a bonding element 63.

Whereas the panel 1, in one embodiment, is in the range of 500-1000 µm thick, the light-transmissive sheet 60 is preferably thinner, e.g. in the range of 50-500 µm. In a preferred embodiment, the panel 1 is made of a substantially rigid material, e.g. glass, PMMA, PC or other material, as already outlined with reference to FIG. 1A. In embodiments where the panel is substantially thicker than the light-transmissive sheet 60, the panel will act as the bulk layer for the entire sandwiched laminated optical element due to its relative thickness. The light-transmissive sheet 60 may be made from the same material as the panel 1. In another embodiment, the light-transmissive sheet 60 is a film made of or comprising a layer of PET (poly(ethylene terephthalate)). PET films may be provided with very small thicknesses, in the range of tens of µm. However, the thinner the PET film is made, the more birefringent it gets. PET in sheet form typically has distinct refractive indices in all 3 dimensions, and the in-plane indices normally increase as the film thickness decreases while the out-of-plane index decreases. In yet another embodiment, the light-transmissive sheet 60 comprises at least a layer of a comparatively rigid material, and preferably the same material as in the panel 1. The light-transmissive sheet 60 may also comprise further layers of different materials, in order to provide certain benefits, such as an anti-fingerprint coating and scratch resistance.

In accordance with the shown embodiments of the invention, touch-sensitivity is thus obtained in the upper surface 61, in which frustration may occur. However, it is only a touch-sensitive region 4 of the upper surface 61 that can be used for input. This region 4 is determined by the optical geometry of the apparatus 100. Light emitted to propagate by TIR cannot hit the upper surface 61 at any steeper angle than the critical angle. Thus, the placement and size of the emitter, and the vertical distance from the emitter 2 to the upper surface 61 may affect how far into the upper surface 61 the perimeter of the touch sensitive region 4 is located.

By providing the light-transmissive sheet 60 such that it extends outside the touch-sensitive region 4 and beyond to cover the emitters 2 and detectors 3, a top surface 61 of the apparatus is obtained which is flush. This may be beneficial in systems utilizing touch sensitivity, which are used not only for pointing input, but also for swiping gestures. Particularly, many graphical user interface operated by touch input involve gestures starting from within the touch-sensitive region 4 and ending at the perimeter of or outside the touch sensitive region 4, to indicate scrolling, sending, flipping, page turning or other functions. When making a gesture with an object 7, particularly when using the tip of your finger, the edge of a mounting frame or housing provided just outside the touch-sensitive region may be sensed by a user. A result thereof may be a negative effect on the user experience, due to the discomfort of swiping your finger over an edge. Another problem may be that grease and dirt may stick to the front surface 5 at the edge of such a mounting frame, which may increase the leakage of ambient light into the panel 1, reduce the overall signal level of the light to be detected, and negatively influence the touch sensitivity at the perimeter. The flush surface 61, which extends over the emitters 2 and detectors 3, may alleviate this problem.

In accordance with the embodiment shown in FIG. 4, a shielding element 70 may also be provided along the perimeter of the front surface 5 of the panel 1. The shielding element 70 is arranged to cover the emitters 2 and detectors 3, and also any light-coupling mechanism and support elements for the emitters 2 or detectors 3. The purpose of the shielding element 70 is two-fold. For one thing, it minimizes the risk of ambient light reaching the detectors 3 from above. This is specifically relevant for light within a predetermined wavelength range of use, in which the touch-sensitive apparatus 100 operates. In other words, a wavelength range in which the emitter 2 outputs light, and the detector 3 is sensitive to. This may be light within the visible range, but is preferably within the infrared region. In one embodiment the predetermined wavelength range of use is in the region of 750 to 1000 nm, in which detectors are readily available at reasonable cost. At higher wavelengths, though, suppression of ambient light may be easier. Secondly, unless shielded the emitters 2 and detectors 3, as well as support elements 22, 32 and any light-coupling mechanism, will be visible around the panel 1. These visible structures may clutter the appearance of the touch-sensitive apparatus 100 and may cause information shown by a display 8 close to its perimeter to be difficult to distinguish. For these reasons, the shielding element 70 is also opaque to visible light. As indicated in FIG. 4, the shielding element 70 is preferably substantially flat, and configured to block IR light and visible light. In embodiments incorporating a shielding element 70, the inner edge thereof may also limit the size of the touch-sensitive region 4 through mechanical vignetting. As shown in FIG. 4, the shielding element 70 preferably extends a portion into an outer region of the front surface 5 so as to protect the detector from angled incident light. In such an embodiment, a lower surface of the shielding element, which faces the outer region of the front surface 5 of the panel, may be specularly reflective with no or only a very small amount of absorption within the predetermined wavelength range of use, in order to minimize reflection losses of light that impinges thereon.

Providing the panel 1 with the shielding element 70 alone, without the light transmissive sheet 60 laminated above, would at least alleviate the mentioned optical issues of ambient light input and visibility of the light-coupling mechanism. However, it would also introduce an edge at the perimeter of the touch-sensitive region 4, and such an edge may be felt during finger swiping, which may have the afore-mentioned drawbacks. By providing the shielding element 70 underneath the light-transmissive sheet 60, this problem is avoided.

In the embodiment of FIGS. 4-7, the emitters 2 and detectors 3 are carried on a support element 9. The support element 9 may be one single structure, or a series of separate structures. More specifically, the support element 9 may be one or more PCB:s, one or more flex films, or similar, each carrying one or more emitters 2 and/or detectors. For the sake of simplicity, the same reference numeral 9 is used for all these variants.

In one embodiment of the invention, the support element 9 carrying at least one of said emitter 2 and said detector 3, is secured towards the lower surface 62 of the light-transmissive sheet. The support element 9 may be an elongate strip, provided along an extended portion of the side edge 13 of the panel 1. The "hanging" adhesion of the emitters 2 and detectors 3 to the upper light-transmissive sheet 60 provides a convenient and robust attachment. In one embodiment, the support element 9 is a flex film which is provided with an extended connector tongue (not shown) to be connected to further circuitry. Compared to a PCB, a flex film has the advantage of a very low profile.

In an embodiment incorporating a shielding element 70 as outlined above, the support member 9 may be secured towards the lower surface 62 of the light-transmissive sheet with the shielding element 70 in between, as seen in FIGS. 4-7. The shielding element 70 may be adhered by gluing to the lower surface 62 of the light-transmissive sheet 60, and also to the front surface 5 of the panel 1. The support element 9 may correspondingly be glued to the lower face of the shielding element 70.

In one embodiment, the shielding element may e.g. be a cut out metal sheet, shaped as a frame, which has a certain degree of rigidity. A benefit of such a design is that the shielding element 70 will provide reinforcement to the lip of the light-transmissive sheet 60 which extends beyond the edge of the panel 1. This, in turn, may increase the strength and durability of the sandwich structure, and may also decrease its sensitivity to pressure applied to the touch-sensitive surface 4. Such a shielding element may e.g. be made from stainless steel with a thickness in the range of 0.2 to 1 mm, but preferably less than 0.5 mm, e.g. 0.4 mm. Other types of metal, or even plastic materials, are also plausible, and the thickness of the sheet may be tailored to the targeted use and size of the touch-sensing system.

In another embodiment, the shielding element 70 is formed directly on the lower surface 62 of the light-transmissive sheet 60, before assembly with the panel. From a production perspective, this may be beneficial. Also, since the upper surface of the shielding element 70 may be seen through the light-transmissive sheet 60, it may be desirable not to have glue in this interface, since bubbles, dust or other artifacts, if caught, will become visible. Forming of the shielding element directly on the lower surface 62 of the light-transmissive sheet 60 may be accomplished by spray painting, screen printing, or any known deposition method, such as by PVD or CVD (Chemical Vapor Deposition) of a suitable metal, e.g. silver, copper or chromium. In addition to the shielding element 70, a layer may be formed directly on the front surface 5 of the panel 1, e.g. by means of a chromium PVD coating of the perimeter of the panel 1. This yields a metalized bottom side reflective coating facing the body of the panel 1.

Figure 6:
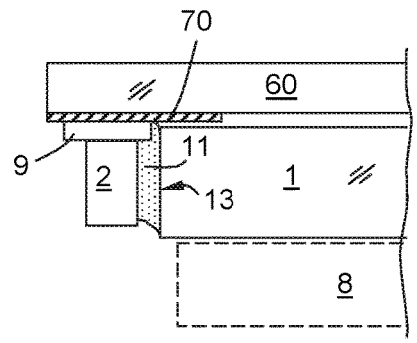
FIG. 6 is a section view of a portion of an edge-coupled laminated touch-sensitive apparatus according to an embodiment of the invention.
Figure 7:
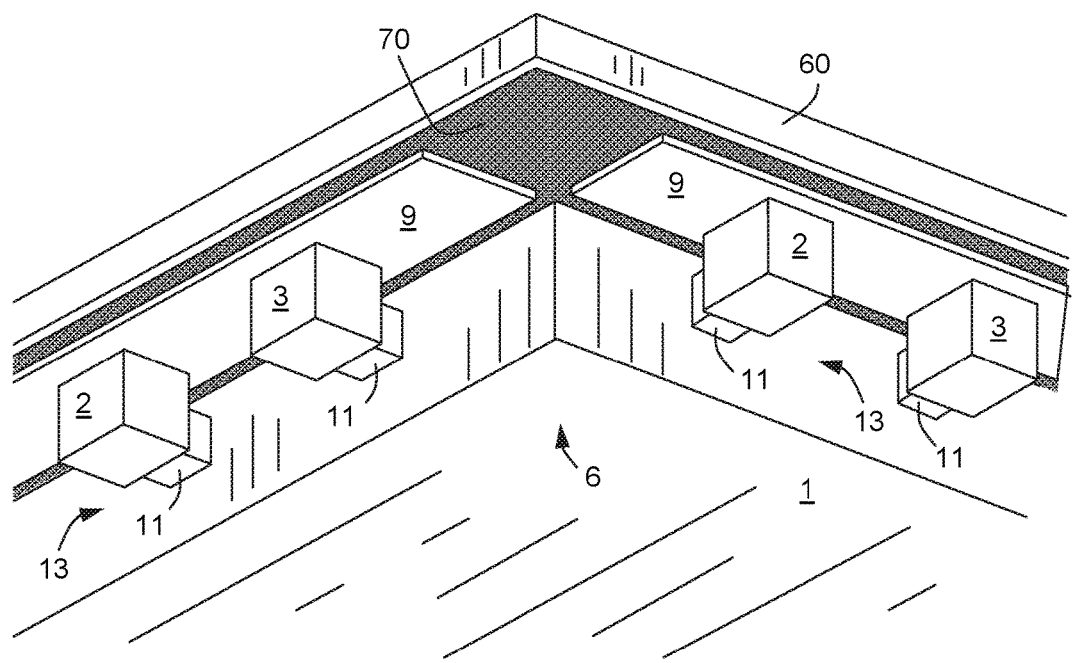
FIG. 7 shows a perspective view of a touch-sensitive apparatus according to one embodiment.

FIGS. 5-7 show an embodiment of the invention from different perspectives. FIG. 5 illustrates a bottom plan view of a touch-sensitive apparatus 100, i.e. from the side at which a display 8 (not shown) may be provided. The support element 9 for the emitters 2 and detectors 3 is provided by means of two separate strips, arranged along each one side edge 13 of the panel 1. These two strips 9 are attached to the shielding element 70, e.g. by gluing. FIG. 5 also shows, by partial transparency of the panel 1, that the shielding element 70 extends over (under in the drawing) the front surface 5 of the panel 1. The support element 9 may include two PCB:s or flex films, and include wiring and potentially also other electric components functionally associated with the emitters 2 or detectors 3. In an alternative embodiment (not shown), a single strip is instead provided, extending around the upper left corner of the panel 1 in the drawing. In yet another embodiment (not shown), separate support elements 9 are provide for each emitter 2 and each detector 3.

The embodiments of FIGS. 5-7 also include the feature of a side connecting element 11 for each one of the emitters 2 and detectors 3. FIG. 6 shows how only one such side connecting element 11 links an emitter 2 to the side edge portion at which it couples light into the panel 1. The side connecting element 11 may be a transparent adhesive, such as a glue or silicon, which adheres the emitter 2 to the side edge 13, and which provides optical matching between the emitter 2 and the panel 1. In a corresponding manner, each detector 3 is secured to the side edge 13 by means of a side connecting element 11, which provides optical matching between the emitter 2 and the panel 1. With the provision of the side connecting element 11, each emitter 2 and detector 3 will be secured to the laminated panel 1 in two directions; upwards to the light-transmissive sheet 60, and sideways to the side edge 13. This is also evident from the perspective view of FIG. 7. In an alternative embodiment (not shown), a string of adhesive, silicon or the like, will act as a side connecting element 11 for a plurality of emitters 2 or detectors 3, or at least one emitter 2 and one detector 3.

The result of the implementation of the side connecting element 11 is that the robustness of the touch-sensitive apparatus 100 may be improved. Also, the two-dimensional attachment of the emitters 2 and detectors 3 can make it possible to use a thinner light-transmissive sheet 60 than otherwise would have been possible, since flexing of the portion of the light-transmissive sheet 60 extending beyond the side edge 13 of the panel 1 will be damped by the securing of the side connecting element 11 to the side edge 13 of the panel, which will function as a securing lever. This, in turn, means that the overall thickness of the touch-sensitive apparatus may be decreased.

Figure 8:
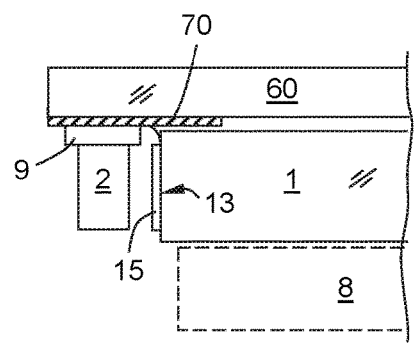
FIGS. 8-11 show section views of a portions of alternative embodiments of an edge-coupled laminated touch-sensitive apparatus according to the invention.

FIG. 8 shows an alternative embodiment, in which a light coupling member 15 is employed instead of a side connecting element 11 that provides optical matching. This light coupling member 15 may include e.g. a lens, a diffraction lattice, a prism, a blocker for light aimed straight through the panel 1, etc. In one embodiment a structured layer is applied to the side edge 13, so as to provide an enhanced light coupling effect at least for input. One example of such a structured layer may be Uniformity Tape by 3M™, which has a rib-like structure provided on a PET film that is adhered to side edge 13. A light coupling member 15 with such a structured layer will thus act as a series of lenses or lattices for a number of emitters 2 and/or detectors 3.

In one embodiment, the light coupling member 15 may include a diffuser, attached to side edge portion adjacent to the emitter 2. The diffuser is configured as a non-imaging component that diffusely transmits a portion of the incoming light into the panel 1. As is well-known to the skilled person, a non-imaging, diffusively transmitting surface will, when illuminated, emit light over a large solid angle at each location on the surface. The diffuse transmission is governed by "scattering" (also known as a combination of "diffuse reflection" and "diffuse transmission") which refers to reflection, refraction and interference (diffraction) of light at a surface as well as by particles dispersed in the bulk beneath the surface, such that an incident ray is scattered at many angles rather than being reflected at just one angle as in "specular reflection" or "specular transmission". Thus, part of the incoming light from the emitter 2 will be scattered by the diffuser, and a portion of this light will be transmitted into the panel 1. A "non-imaging" optical component is, in contrast to an imaging optical component, not designed with respect to the phase of the incoming light e.g. for the purpose of forming an image of a light source in a focal plane or generating a highly collimated beam of light, but is instead designed to achieve a dedicated optical radiative transfer of light from a source onto a target regardless of the phase of the light. Accordingly, when illuminated, the diffuser will act as a light source which is located in contact with the propagation channel inside the panel 1 to emit diffuse light. The light source realized by the diffuser thereby defines the actual origin of the detection lines that are generated by the light from the respective emitter 2. Since the diffuser more or less randomly re-distributes the incoming light, the importance of the luminance profile of the emitter 2 as well as the requirement on index matching and on the quality of the side edge 13 is reduced or even eliminated. This means that the diffuser has the ability to act as a light source for many different types of emitters 2 and for many different relative orientations between the emitter 2 and the diffuser, as long as the light from the emitter 2 hits the diffuser with a proper extent and at a proper location. Thus, compared to conventional coupling elements that operate by optical imaging, the sensitivity to manufacturing and mounting tolerances is reduced and assembly of the apparatus 100 is facilitated. This makes this embodiment better suited for mass production. The diffuser may e.g. be a coating, layer or film, or be realized by structuring of the edge by blasting, grinding, etching. In one embodiment the diffuser may be provided by means of a matte white paint or ink, applied to the side edge 13. Furthermore, the paint may be optimized to obtain a desired diffusive transmission ratio, e.g. by including pigments with low refractive index or spherical objects of different materials. One such pigment is $SiO_2$, which has a refractive index n=1.6. There are many dedicated materials that are commercially available, e.g. the fluoropolymer Spectralon, barium-sulphate-based paints or solutions, granular PTFE, microporous polyester, Makrofol® polycarbonate films provided by the company Bayer AG, etc.

In a corresponding manner, each detector 3 is arranged to optically face a light coupling member 15 comprising a diffuser, at the side edge 13 of the panel 1. The diffuser diffusely transmits a portion of the incoming propagating light, whereby at least part of the diffusively transmitted light reaches the detector 3. Accordingly, each diffuser such will act as a light source that diffusively emits "detection light" for receipt by the detector 3. The diffusers for the emitters 2 and the diffusers for the detectors 3 may be configured in the same way, to attain corresponding advantages. Further details with regard to diffusive coupling in an FTIR system can be found in applicants prior U.S. provisional application 61/675,032 and Swedish patent application SE1250890-9, both filed on Jul. 24, 2012, (equivalent to PCT/SE2013/050922, filed on Jul. 22, 2013) which are hereby incorporated by reference.

Alternative embodiments for mounting of emitters 2 at the side edge 13 of the panel 1 will now be described with reference to FIGS. 9-11. It should be noted that for each embodiment, a corresponding arrangement may be employed for the detectors 3. Common for the embodiments shown in these drawings, is that a shielding element 70 preferably is included at the lower face of the light-transmissive sheet 60, which may be configured in any of the ways disclosed above. Furthermore, a mounting frame 91 is disclosed, which as such does not form part of the invention, in which the sandwiched element of the panel 1 and light-transmissive sheet 60 is suspended. A gasket or adhesive 92 may also be arranged between the light-transmissive sheet 60 and the mounting frame 91.

Figure 9:
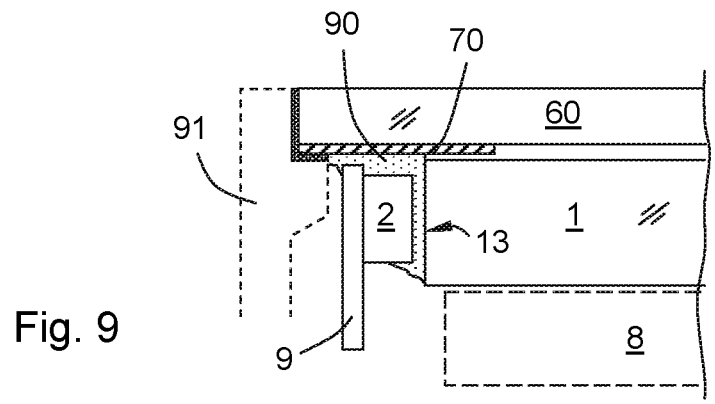

In FIG. 9 an emitter 2 is used, which is mounted to a support structure 9, such as a PCB or flex film as discussed for previous embodiments. The emitter 2 in this embodiment is of a type which primarily emits light from its top, i.e. the side of the emitter 2 opposite to the base which attaches to the support structure 9. For this reason, the support structure 9 is arranged at angle, typically about 90°, to the front surface 5 of the panel 1, such that the emitter 2 is directed to emit light towards the side edge 13. In this embodiment, optical silicon 90 is used as a side connecting element, so as to attach the emitter 2 towards the side edge 13 of the panel 1 and provide optical matching. Preferably, and as shown in FIG. 9, optical silicon 90 is applied not only between the emitting end of the emitter 2 and the side edge 13, but also between the side of the emitter 2 facing upwards and the light-transmissive sheet 60. This way, the emitter 2 is secured in two directions, which renders a strong attachment. The support structure 9 may furthermore be suspended in the frame 91 by adhesion or other means, even though it is illustrated as unattached in the drawing.

Figure 10:
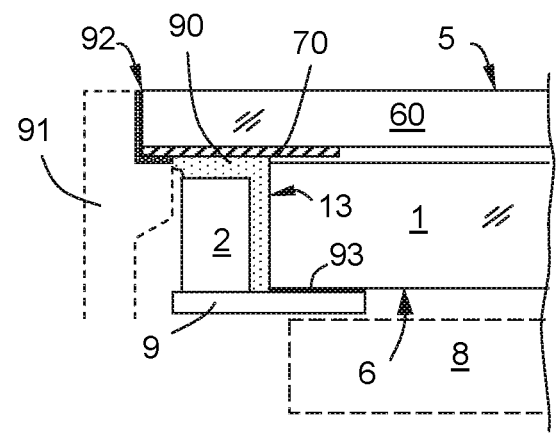

FIG. 10 shows another embodiment, in which an emitter 2 is mounted to a support structure 9. The emitter 2 in this embodiment may be of the same type as in FIG. 6, configured to primarily emit light from its side. However, the support structure, which extends in the same general plane as the panel 1, is attached underneath the panel 1, to its rear surface 6. Attachment to the panel 1 may e.g. be accomplished by means of an adhesive or tape 93. Optical silicon 90 may also be provided, as illustrated, as a side connecting element, so as to attach the emitter 2 towards the side edge 13 of the panel 1 and provide optical matching. The optical silicon 90 may be applied not only between the emitting end of the emitter 2 and the side edge 13, but also between the side of the emitter 2 facing upwards and the light-transmissive sheet 60.

Figure 11:
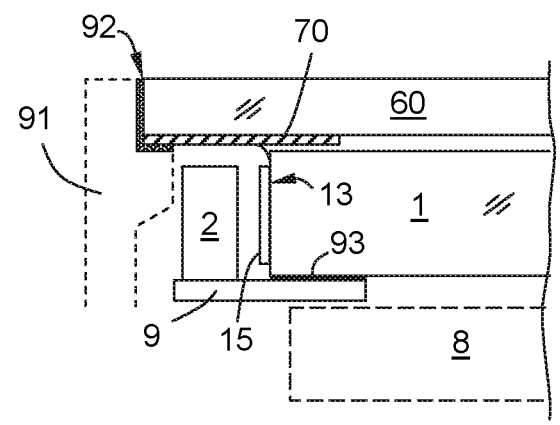

FIG. 11 shows an embodiment which is similar to the embodiment of FIG. 10. The difference is that instead of optical matching provided by means of silicon 90, a light coupling member 15 is provided between the emitter 2 and the side edge 13 of the panel 1. Functionally, this embodiment is therefore similar to the embodiment disclosed with reference to FIG. 8.

Figure 12:
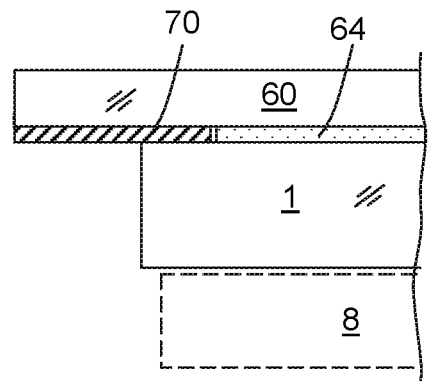
FIGS. 12-14 show details related to a shielding element in various embodiments of an edge-coupled laminated touch-sensitive apparatus according to the invention.
Figure 13:
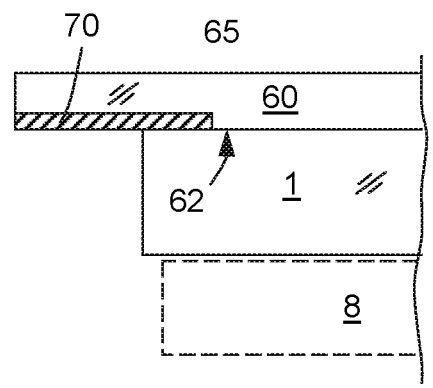
Figure 14:
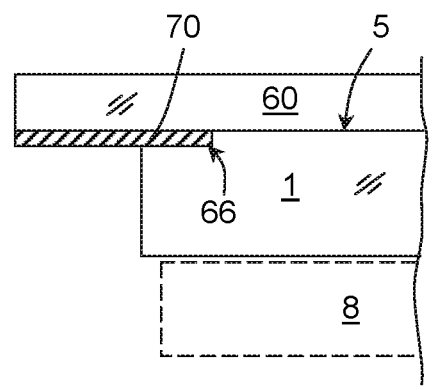

All embodiments disclosed above have been described as optionally including a shielding element 70. Also the benefits of such an arrangement have been outlined. Where such a shielding element 70 is provided by means of a thin metal layer of paint or metal coating deposited on the lower surface of the light-transmissive sheet 60, it may be configured with a very low profile, down to single microns or even less than one micron. In such cases, there may be no reason to make any special arrangement to accommodate for the difference in the gap between the light-transmissive sheet 60 and the panel 1. However, if a substantially rigid shielding element 70 is used, such as a cutout metal sheet, its thickness may be up to several hundred microns as previously outlined. For such an embodiment, it may be suitable to make arrangements to adapt to the mechanical threshold rendered by the shielding element 70. FIGS. 12-14 provide different ways of solving that particular problem. For the sake of simplicity, emitters 2 and detectors 3 are left out in these drawings, and so are any side connecting elements 11 or light coupling members 15 for coupling emitters 2 and detectors 3 to the panel 1. In fact, any one of the embodiments already described with reference to FIGS. 4 to 11 may be combined with any one of the embodiments of FIGS. 12 to 14.

FIG. 12 illustrates an embodiment, in which an adapter sheet 64 is provided between the panel 1 and the light-transmissive sheet 60, so as to even out the gap there between. Consequently, an adapter sheet 64 which has a thickness equal, or as close as possible, to the thickness of the shielding element 70 should be used. The adapter sheet 64 shall of course also be light-transmissive in at least the wavelength range of use for the apparatus, normally in the NIR, and also to visible light. Examples of transmissive films usable for the adapter sheet 64 are the aforementioned OCA and CEF, which are available in many different thicknesses. In other embodiments, the adapter sheet 64 may be provided in liquid form which is subsequently cured, in either a wet bonding process or a dry bonding process, both of which are well known in the art of lamination. In another embodiment, silicon may be used as a material for filing up the space, so as to act as an adapter sheet 64.

FIG. 13 shows another embodiment, in which the height difference is adjusted by providing a recess 65 in the lower surface 62 of the light-transmissive sheet 60. The recess 65 should preferably be as deep as the shielding element 70 is thick, so as to more or less completely even out the gap size.

FIG. 14 shows a variant of the preceding embodiment, in which the height difference is instead adjusted by providing a recess 66 in the front surface 5 of the panel 1. The recess 66 should preferably be as deep as the shielding element 70 is thick, so as to more or less completely even out the gap size.

As the skilled person will realize, any combination of two or all of the embodiments of FIGS. 12-14 are also possible, even though the drawings do not show such combinations. In other words, a combination of a recess 65 and a recess 66 can be provided, where the added depth of those recesses are as close as possible to the thickness of the shielding element 70. Also, an adapter sheet 64 may be employed in addition to either a recess 65 or a recess 66, or both. It should also be noted that any known method may be used for laminating the light-transmissive sheet 60 to the panel 1, as discussed already with reference to FIG. 4, but that no remaining gap or separate bonding element is shown between the light-transmissive sheet 60 and the panel 1 for the sake of simplicity in FIGS. 12-14.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing, as well as the specific examples of the light-coupling mechanism for input and output of light, are merely given as examples. Also, additional transmissive layers may be provided over the upper surface 61. The inventive coupling structure is useful in any touch-sensing system that operates by transmitting light, generated by a number of emitters, inside a light-transmissive panel and detecting, at a number of detectors, the decrease in propagating light caused by the frustration at the point of touch.

The invention claimed is:
1. A touch-sensitive apparatus, comprising:
  a light-transmissive panel having a front surface, an opposite rear surface, and a first side edge and a second side edge connecting the front surface and the rear surface;
  a light emitter positioned on a first support structure, said light emitter configured to input light at a first side edge portion, wherein the first support structure is separate from the light-transmissive panel;
  a detector positioned on a second support structure, said detector configured to receive light output through a second side edge portion;
  a light-transmissive sheet laminated over the front surface of the light-transmissive panel, the light-transmissive sheet having a first portion extending beyond the first side edge of the light-transmissive panel, the first portion configured to cover the light emitter and a second portion extending beyond the second side edge of the light transmissive panel, the second portion configured to cover the detector;
  a shielding element positioned between the first support structure and a lower surface of the light-transmissive sheet, the shielding element covering said light emitter, and the shielding element configured to block light having a wavelength range in which the light emitter outputs light;
  wherein the lower surface of the light-transmissive sheet is in optical contact with the front surface of the light-transmissive panel, so as to allow input light to propagate between the light emitter and the detector through the light-transmissive panel and the light-transmissive sheet via total internal reflection between an upper surface of the light-transmissive sheet and the rear surface of the light-transmissive panel;
  wherein at least a first reflection of the input light at the upper surface of the light-transmissive sheet and a second reflection at the rear surface of the light-transmissive panel are at critical angles resulting in total internal reflection of the input light between at least the first reflection and the second reflection; and
  wherein the first reflection and the second reflection are consecutive reflections of the input light.

2. The touch-sensitive apparatus of claim 1, wherein the first support structure is secured towards the lower surface of the light-transmissive sheet.

3. The touch-sensitive apparatus of claim 1, wherein the first support structure is secured towards the rear surface of the light-transmissive panel.

4. The touch-sensitive apparatus of claim 2, wherein said support structure is a printed circuit board.

5. The touch-sensitive apparatus of claim 2, wherein said support structure is a flex film.

6. The touch-sensitive apparatus of claim 2, wherein said support structure is an elongate strip along an extended portion of the side edge, and configured to support at least one of a plurality of emitters or a plurality of detectors.

7. The touch-sensitive apparatus of claim 1, further comprising:

a side connecting element configured to secure at least one of said light emitter and said detector towards the side edge of the light-transmissive panel.

8. The touch-sensitive apparatus of claim 7, wherein said side connecting element includes a transparent adhesive or silicon, and said side connecting element is configured to provide optical matching to the light-transmissive panel.

9. The touch-sensitive apparatus of claim 1, wherein the shielding element is a rigid metal sheet member configured to reinforce the portion of the light-transmissive sheet extending beyond the side edge of the light-transmissive panel.

10. The touch-sensitive apparatus of claim 1, wherein the shielding element covers an outer region of the front surface to suppress ambient light incident on the upper surface, within a wavelength range of use, from specularly reaching at least said detector.

11. The touch-sensitive apparatus of claim 1, wherein the shielding element is non-transmissive to visible light.

12. The touch-sensitive apparatus of claim 1, wherein a lower surface of the shielding element, which faces an outer region of the front surface of the light-transmissive panel, is specularly reflective within a wavelength range of use.

13. The touch-sensitive apparatus of claim 2, wherein said support structure is attached to a lower surface of the shielding element.

14. The touch-sensitive apparatus of claim 1, wherein the light-transmissive sheet includes a rigid layer.

15. The touch-sensitive apparatus of claim 14, wherein the rigid layer is composed of the same material as the light-transmissive panel.

16. The touch-sensitive apparatus of claim 1, further comprising:
   a light coupling member arranged at the side edge, and configured to optically connect at least one of the light emitter and the detector to the light-transmissive panel.

17. The touch-sensitive apparatus of claim 16, wherein the light coupling member includes at least one non-imaging, diffusively transmitting optical element arranged on the side edge of the light-transmissive panel;
   the light emitter is configured to emit a beam of light onto the at least one non-imaging, diffusively transmitting optical element; and
   the detector is configured to receive detection light generated by diffuse transmission as propagating light from within the light-transmissive panel impinges on the at least one non-imaging, diffusively transmitting optical element.

18. The touch-sensitive apparatus of claim 1, wherein the light-transmissive panel is thicker than the light-transmissive sheet.

19. The touch-sensitive apparatus of claim 1, wherein the light-transmissive panel overlays a display.

* * * * *